United States Patent
Albers et al.

(10) Patent No.: US 7,300,693 B2
(45) Date of Patent: *Nov. 27, 2007

(54) RESIN INFUSED TRANSPARENT SKIN PANEL AND METHOD OF MAKING SAME

(75) Inventors: Robert G Albers, Kent, WA (US); Paul S Nordman, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/655,257

(22) Filed: Sep. 4, 2003

(65) Prior Publication Data

US 2005/0053765 A1 Mar. 10, 2005

(51) Int. Cl.
*B32B 3/24* (2006.01)
*B64C 1/14* (2006.01)

(52) U.S. Cl. .................. 428/139; 428/138; 428/140; 428/192; 428/34; 428/38; 52/204.62; 244/129.3; 244/119; 156/99; 156/242

(58) Field of Classification Search ............ 428/138, 428/139, 140, 192, 34, 38; 52/204.62; 244/129.3; 244/119; 156/99, 242
See application file for complete search history.

(56) References Cited

U.S. PATENT DOCUMENTS

| | | | | |
|---|---|---|---|---|
| 690,101 A | * | 12/1901 | Cooper | 206/77.1 |
| 3,584,567 A | * | 6/1971 | Roach | 454/73 |
| 4,489,123 A | | 12/1984 | Schijve | |
| 4,935,291 A | | 6/1990 | Gunnink | |
| 4,964,594 A | | 10/1990 | Webb | |
| 4,992,323 A | | 2/1991 | Vogelesang et al. | |
| 5,039,566 A | * | 8/1991 | Skubic et al. | 428/113 |
| 5,128,678 A | | 7/1992 | Novak | |
| 5,160,771 A | | 11/1992 | Lambing | |

(Continued)

FOREIGN PATENT DOCUMENTS

| | | |
|---|---|---|
| JP | 10-36139 | 2/1998 |
| WO | WO 96/30203 | 10/1996 |
| WO | WO 00/20275 | 4/2000 |

OTHER PUBLICATIONS

Gail Bohnhoff-Hlavacek, (Boeing-IPC), Preliminary VISTA IP Summary, Jun. 12, 2003, 2 pages.

(Continued)

*Primary Examiner*—William P Watkins, III
(74) *Attorney, Agent, or Firm*—Harness, Dickey & Pierce, P.L.C.

(57) ABSTRACT

A transparent skin panel for use in a mobile platform having a plurality of metal sheets. A fiber reinforced resin at least partially surrounds the plurality of metal sheets. The fiber reinforced resin is transparent. A cutout is formed within each of the plurality of metal sheets, which is filled by the transparent resin during the manufacturing process. The cutout corresponds to a window in the transparent skin panel. The transparent skin panel thus eliminates the need for a bulky and heavy frame structure that has traditionally been employed on aircraft, and which has heretofore limited the size of windows used on an aircraft. The present invention thus enables larger windows to be incorporated on aircraft without increasing the weight or cost associated with such windows.

5 Claims, 2 Drawing Sheets

U.S. PATENT DOCUMENTS

| | | | |
|---|---|---|---|
| 5,429,326 | A | 7/1995 | Garesche |
| 5,500,272 | A * | 3/1996 | Padden ..................... 428/140 |
| 5,547,735 | A | 8/1996 | Roebroeks |
| 5,665,450 | A | 9/1997 | Day |
| 5,721,034 | A | 2/1998 | Seemann, III et al. |
| 5,951,800 | A | 9/1999 | Pettit et al. |
| 5,988,566 | A * | 11/1999 | Meyer ..................... 244/129.3 |
| 6,082,674 | A | 7/2000 | White et al. |
| 6,818,306 | B2 | 11/2004 | Miller et al. |
| 6,889,938 | B1 * | 5/2005 | Nordman ................. 244/129.3 |
| 2003/0080251 | A1 | 5/2003 | Anast |
| 2003/0082341 | A1 | 5/2003 | Chu |
| 2004/0212959 | A1 | 10/2004 | Rotta et al. |
| 2005/0035478 | A1 | 2/2005 | Sewell et al. |
| 2005/0048260 | A1 | 3/2005 | Modin et al. |
| 2005/0051255 | A1 | 3/2005 | Nordman |

OTHER PUBLICATIONS

Kerang Han, Ben Wang, and Chun Zhang, Resin Infusion Process with Fiber Stiffner, Florida State University, Office of Research, Technology Transfer, Jun. 9, 2003, pp. 1-2.

McNichols, Perforated Metal Products, Jun. 9, 2003, pp. 1-2.

TPI Technology, Inc., An Overview of the SCRIMP Technology, 2001, pp. 1-12.

TPI, The SCRIMP Advantage, Jun. 9, 2003, pp. 1-3.

Hongy Lin et al., "The Effect of Fiber Annealing on the Properties of an Optically Transparent PMMA Composite", Composites Science and Technology 50 (1994), pp. 367-372.

Kevin D. Weaver et al., interfacial Bonding and Optical Transmission for Transparent Fiberglass/Poly (Methyl Methacrylate) Composites, Polymer Composites, Apr. 1995, vol. 16, No. 2.

H. Lin, et al., Temperature and Wavelength Dependent Transmission of Optically Transparent Glass Fibre Poly (methyl methacrylate) Composites, 1994, Chapman & Hall.

Hongy Lin, et al., Aging Behavir of Optically Transparent Poly (Methyl Methacrylate) Composites, Polymer Composites, Oct. 1993, vol. 14, No. 5, pp. 402-409.

Kevin D. Weavers et al., Preparation and Properties of Optically Tranparent, Pressure-Cured Poly (Methyl Methacrylate) Composites, Polymer Composites, Dec. 1993, vol. 14, No. 6.

Hongy Lin, et al., Model for the Temperature Dependent Transmission of Optically Transparent Poly (methyl methacrylate) Composites, J. Mater. res., vol. 8, No. 2, Feb. 1993, pp. 364-370.

James R. Olson, et al., "Fabrication and Mechanical Properties of an Optically Transparent Glass Fiber/Polymer Matrix Composite", Journal of Composite Materials, vol. 26, No. 8/1992, pp. 1181-1192.

Hongy Lin, et al., Optical and Mechanical Properties of Optically Transparent Poly(methyl methacrylate) Composites, Polymer Engineering and Science, Mid-Mar. 1992, vol. 32, No. 5.

* cited by examiner

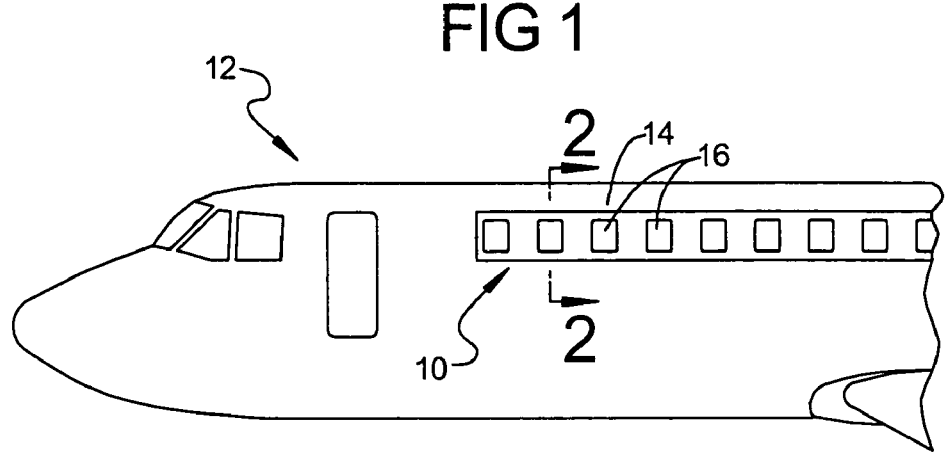
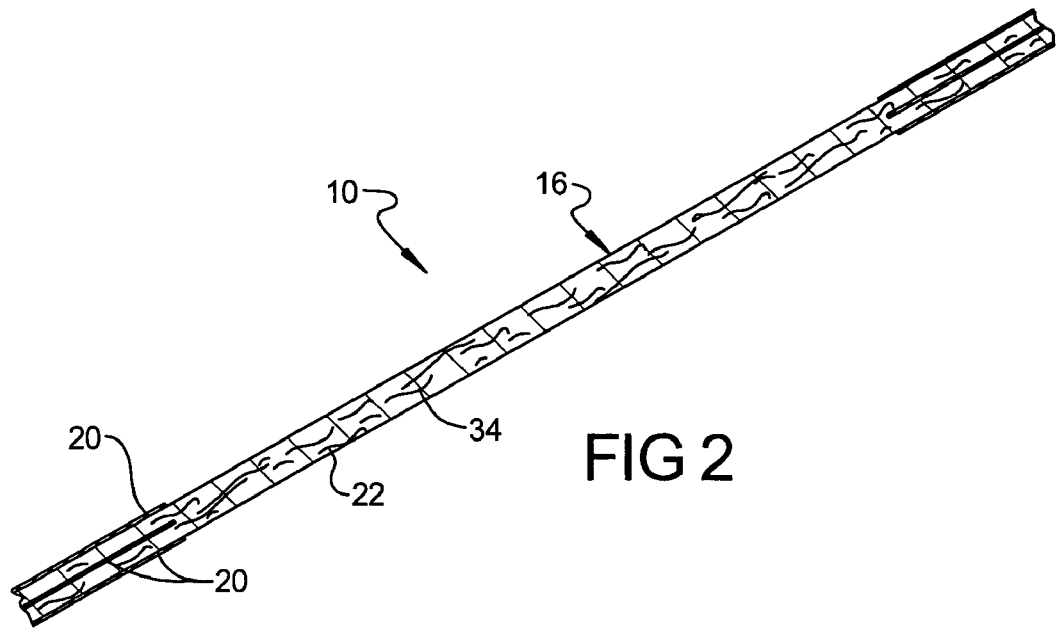

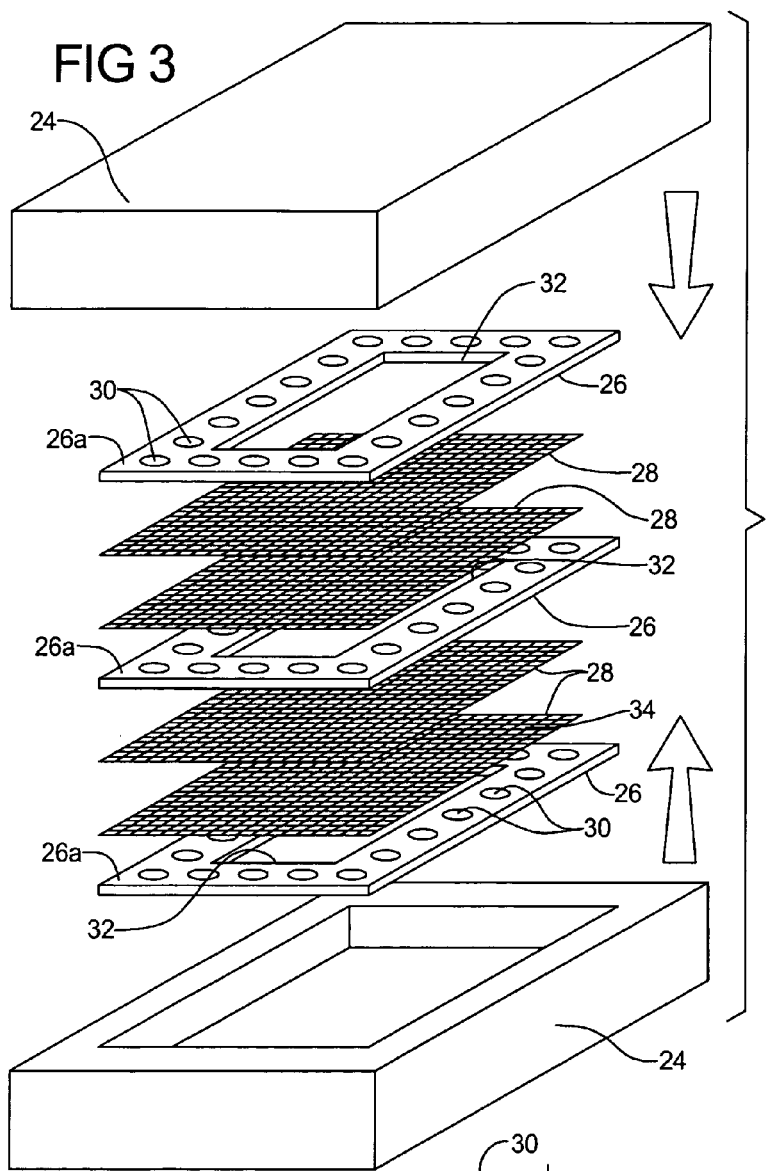
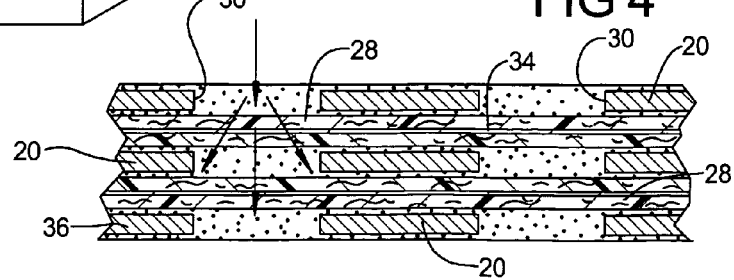

RESIN INFUSED TRANSPARENT SKIN PANEL AND METHOD OF MAKING SAME

FIELD OF THE INVENTION

The present invention relates to transparent aircraft skin panels and more particularly to a resin infused transparent skin panel and method of making same particularly well adapted for use in aircraft and aerospace applications.

BACKGROUND OF THE INVENTION

Passenger windows in most commercial aircraft are relatively small in size. This is due, in part, to the limited capabilities of current transparent window materials and also due to the heavy and complex support structure needed to support these windows within the frame of the aircraft.

Typically, these transparent window materials consist of a transparent polymer. While very successful and exhibiting such useful qualities as high durability and easy formation of complex shapes, these polymer windows do have a limited strength capability.

Windows require the heavy support structure in order to support the window within the structural skin of the aircraft. This support structure generally includes window forgings, and stringers. Each component is designed to strengthen the skin panel which surrounds and supports the window. However, each component added in turn increases the cost and weight of the completed window assembly, thereby providing an incentive to keep passenger windows relatively small.

Accordingly, it would be highly desirable to either decrease the weight of current passenger window assemblies in modern aircraft and to alternatively provide larger passenger windows.

Accordingly, it would also be desirable to provide a method of making a transparent skin panel for use with an aircraft that provides an integrally formed transparent window panel that is both stronger and lighter than current passenger windows.

SUMMARY OF THE INVENTION

A transparent skin panel for use in a mobile platform is provided. The transparent skin panel includes a plurality of metal sheets. A fiber reinforced resin at least partially surrounds the plurality of metal sheets forming a fiber metal laminate. The fiber reinforced resin is transparent. A cutout is formed within each of the plurality of metal sheets. The cutout corresponds to a window in the transparent skin panel.

A method of manufacturing the transparent skin panel is also provided. The method includes providing a mold. A preform of fibers is provided. A metal sheet having a plurality of perforations formed therein is next provided. The preform and metal sheet are inserted in an open or closed mold such that the metal sheet and the preform are aligned one atop the other. A resin is then infused into the mold such that the resin flows through the perforations of the metal sheet and at least partially covers the metal sheet and the preform. The resin and preform of fibers are substantially transparent.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a partial view of a front of an aircraft having a transparent skin panel constructed according to the principles of the present invention;

FIG. 2 is a side cross sectional view of the transparent skin panel taken in the direction of arrow 2-2 in FIG. 1;

FIG. 3 is an exploded perspective view of the materials used to construct the transparent skin panel of FIG. 2; and FIG. 4 is a cross sectional view of a portion of the transparent skin panel of FIG. 2 illustrating the layering and resin flow during the construction of the transparent skin panel.

DETAILED DESCRIPTION OF THE PREFERRED EMBODIMENTS

The following description of the preferred embodiment(s) is merely exemplary in nature and is in no way intended to limit the invention, its application, or uses.

Referring to FIG. 1, there is illustrated a transparent skin panel 10 constructed according to the principles of the present invention shown mounted to an aircraft 12. The transparent skin panel 10 includes a skin portion 14 and a window portion 16. While in the particular example provided the transparent skin panel 10 is illustrated as including a side window of the aircraft 12, it is to be understood that the transparent skin panel 10 may be used in any portion of the aircraft 12 and may include a cockpit window, a side window, a door, or an unbroken surface.

With reference to FIG. 2, the transparent skin panel 10 is coupled to the structural frame component (not shown) of the aircraft 12. Skin portion 14 includes a plurality of metal sheets 20 and a fiber reinforced resin 22. The metal sheets 20 are suspended within the fiber reinforced resin 22. In the particular example provided, three metal sheets 20 are illustrated. It is to be understood, however, that a greater or lesser number of metal sheets 20 may be used as are desired. Moreover, while the metal sheets 20 are illustrated as spaced on each side of the fiber reinforced resin 22 and within the fiber reinforced resin 22, the metal sheets 20 may be located anywhere within the fiber reinforced resin 22, as will be described in greater detail below.

The window portion 16 is preferably comprised solely of the fiber reinforced resin 22. The fiber reinforced resin 22 is transparent for allowing viewing therethrough as will be described in greater detail below.

Turning now to FIG. 3, a method of constructing the transparent skin panel 10 will now be described. A mold 24 is provided, illustrated schematically in FIG. 3, capable of receiving the components of the transparent skin panel 10. The mold 24 has a cavity (not shown) shaped to form the outer surface of the transparent skin panel 10. This shape, while illustrated as essentially rectangular and flat in FIGS. 1 and 2, may be any shape as required by the contour of the aircraft 12, for example round and curved.

A plurality of metal sheets 26 and a plurality of fiber preforms 28 are then provided. The metal sheets 26 include a plurality of perforations 30 formed in a perimeter portion 26a. The perforations 30 are illustrated as circular although any size or shape may be employed. Each metal sheet 26 includes a cutout 32 in the center thereof. The cutout 32 in each metal sheet 26 corresponds to the window portion 16 of the assembled transparent skin panel 10. Again, while the cutout 32 is illustrated as circular, it may be of any shape including for example oval or rectangular. The metal sheets 26 are preferably made of aluminum due to its light weight and high strength, although various other metals may be employed including, for example, titanium.

The fiber preforms 28 each include a plurality of fibers 34 woven together to form a fiber mesh. The orientation of the plies is based on the desired directional strength of the resulting structure and may have unidirectional or bi-directional strength (e.g. the fibers 34 may run either in one direction (not shown) or two directions).

The metal sheets 26 and fiber preforms 28 are then inserted into the mold 24 in an order corresponding to the desired order of sheets in the transparent skin panel 10. In the particular example provided, the metal sheets 26 alternate with double layers of the fiber preforms 28.

The mold 24 is then either closed, or a vacuum bag is applied and a resin is infused into the mold using a process such as Controlled Atmospheric Pressure Resin Infusion (CAPRI), Seemann Composite Resin Infusion Molding Process (SCRIMP™), Vacuum Assisted Resin Transfer Molding (VARTM), Resin Transfer Molding (RTM), or Resin Film Infusion (RFI). Other suitable methods of infusing resin into the mold 24 not listed herein may also be employed.

As best seen in FIG. 4, the resin, indicated by reference numeral 36, flows in the direction of the arrows through the perforations 30. The resin 36 moves through the fiber preforms 28, thereby fully wetting (e.g. fully covering and saturating) the fibers 34. The transparent skin panel 10 is then cured over a period of time until the resin 36 hardens. The mold 24 is then opened and the transparent skin panel 10 removed. The metal sheets 26 correspond to the metal sheets 20 (FIG. 2) and the resin 36 and fiber preforms 28 correspond to the fiber reinforced resin 22 (FIG. 2).

Preferably the resin is an aliphatic epoxy which is resistant to ultraviolet degradation. However, other alternate resin materials may be employed. To impart transparency, the resin 36 is transparent and the fibers 34 substantially transparent within the transparent skin panel 10. The index of refraction of the fibers 34 is matched to the index of refraction of the resin 36. In this way, the transparent skin panel 10 is fully transparent in the areas of the cutouts 32 in the metal sheets 26.

By integrally forming the transparent reinforced resin 22 with the metal sheets 20, a solid and high strength transparent skin panel 10 is provided. Simultaneously, the heavy support structure typically used to frame aircraft windows is substantially eliminated, thus reducing the overall weight of the aircraft. This in turn allows for larger windows to be employed, if desired, without increasing the cost and weight of the aircraft.

While the present invention has been described in connection with aircraft windows, it will be appreciated that the invention can be incorporated on other forms of mobile platforms such as buses, trains, ships, etc., where composite panels may be employed, or even on fixed structures where lightweight windows are needed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A light weight aircraft fuselage skin panel having an array of integrated optically clear single pane window assemblies, the skin panel comprising:
   one metal sheet having a central cutout portion and a perimeter portion having a plurality of spaced apart perforations;
   a fiber reinforced preform disposed against the one metal sheet, the fiber reinforced preform extending continuously across one dimension of the metal sheet such that fibers of the fiber reinforced preform reinforce the skin panel along a periphery of the central cutout portion;
   a portion of the metal sheet at least partially covering the preform and forming a portion of an outer surface of at least one of the window assemblies; and
   a resin filling the cutout portion saturating the preform and filling the perforations in the metal sheet to form an unitary optically clear fiber reinforced window assembly having an optically transparent skin panel portion exhibiting a resin bonded integrated structure that substantially reduces a weight of said optically clear, fiber reinforced window assembly.

2. The skin panel of claim 1, further comprising:
   a second metal sheet covering the opposite side of the preform forming a portion of the outer surface of the at least one window assembly having an integrated metal-preform-metal cross section construction.

3. The skin panel of claim 2, further comprising:
   a second fiber reinforced preform disposed against a second metal sheet; and
   a third metal sheet disposed between the first and second metal sheets and forming a portion of the at least one window assembly having an integrated metal-preform-metal-preform-metal cross section.

4. The skin panel of claim 1, further comprising:
   at least two window panes longitudinally spaced apart.

5. A light weight aircraft fuselage skin panel having an array of integrated, optically clear single pane window assemblies, the skin panel comprising:
   a first metal sheet having a plurality of central cutout portions, each said cutout portion having a perimeter portion;
   each said perimeter portion having a plurality of spaced apart perforations spaced circumferentially therearound;
   a fiber reinforced preform disposed against the first metal sheet, the fiber reinforced preform extending continuously across one dimension of the first metal sheet such that fibers of the fiber reinforced preform reinforce the skin panel along each said perimeter portion of each said central cutout portion;
   a portion of the first metal sheet at least partially covering the fiber reinforced preform and forming a portion of an outer surface of each said window assembly; and
   an optically transparent resin filling each of the central cutout portions and saturating the fiber reinforced preform, and filling the perforations in each said perimeter portion of the first metal sheet, to form an integrated, unitary skin panel having a plurality of optically clear, fiber reinforced window assemblies longitudinally spaced apart from one another that substantially reduces a weight of said skin panel while providing a needed level of structural strength.

* * * * *